Figure 1:
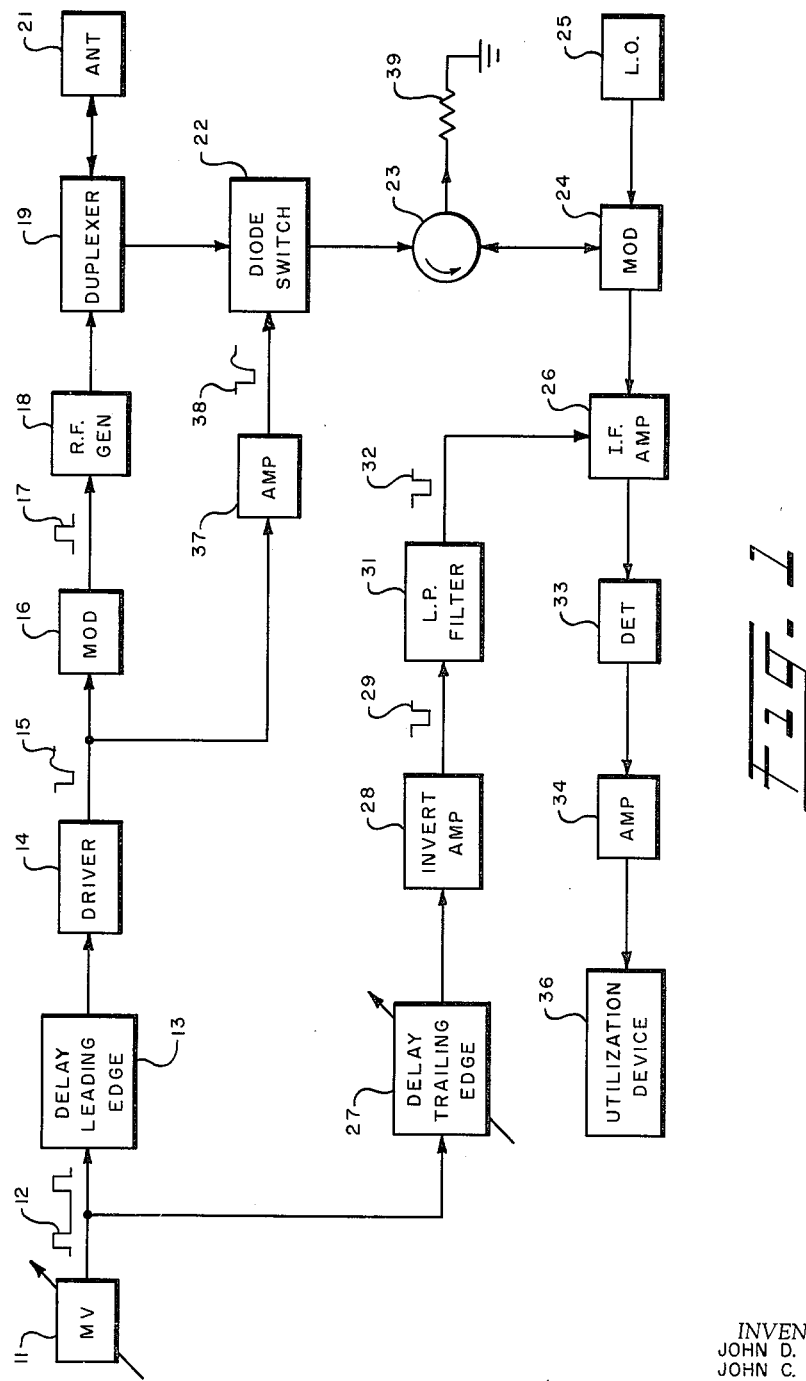

INVENTOR.
JOHN D. FACKLER
JOHN C. ROLFS

United States Patent Office

3,217,323
Patented Nov. 9, 1965

3,217,323
RECEIVER GATING CIRCUIT
John D. Fackler, Bedford, and John C. Rolfs, Pleasantville, N.Y., assignors to General Precision, Inc., a corporation of Delaware
Filed Aug. 27, 1963, Ser. No. 304,774
6 Claims. (Cl. 343—17.1)

This invention relates generally to pulsed Doppler radar aerial navigation systems and particularly to a novel system for gating the receiver off during transmitter pulses and on during the interval between pulses.

The low altitude performance capability of a pulsed Doppler radar navigation system depends upon many factors. For example, it is necessary that the antenna have a radiation pattern which provides a substantial amount of illumination at low depression angles transverse to the direction of travel of the aircraft so that the range will be sufficient to delay the return of a substantial part of the reflected energy until after cessation of transmission at which time the receiver is operative. As another example, it is necessary that the high voltage pulse applied to the transmitting tube have a fast fall time to prevent the generation of unwanted noise signals which arise when less than full voltage is applied. As another example, the receiver must be gated on as soon and as rapidly as possible after passage of the transmitter pulse so as to receive useful signals from short ranges while excluding transmitter energy and noise. The present invention is concerned primarily with the apparatus for gating the receiver and it will be assumed that both a suitable antenna and a suitable transmitter pulse generating circuit are incorporated into the system.

In the usual pulsed radar system, the transmitter tube and the receiver are coupled to the antenna through a duplexer. On the receiver side, the duplexer is ordinarily connected directly to a balanced crystal modulator where the reflected energy is mixed with the energy from a local oscillator. The modulation products are passed to an intermediate frequency amplifier and then to detecting, amplifying, indicating and control circuit components. Receiver gating is performed by a pulse, synchronized with the transmitter pulse, which cuts off one or more stages of the intermediate frequency amplifier during periods of transmission. Such a system has the disadvantage that, during transmission, a portion of the energy from the transmitter leaks through the duplexer to the modulator. Additionally, some of the transmitter power is reflected by the antenna itself and passes through the duplexer to the modulator. The power thus leaking to the modulator, although a small proportion of the total transmitter power, is sufficient to be troublesome, and may be as much as four watts in a system in which the peak transmitter power is 40 watts. The leakage power applied to the modulator tends to overload the crystals, causing early failure unless the crystals are more rugged than would otherwise be necessary to handle the useful signals during reception or unless they are protected by auxiliary devices. But what is more pertinent for present purposes is that the leakage power is mixed with power from the continuously operating local oscillator to form modulation products within the receiver pass band which products are applied to the intermediate frequency amplifier. The signals so applied may amount to as much as one hundred milliwatts of power and cause the intermediate frequency amplifier to resonate, or "ring," even though the first stages are biased to cut off. The cut off bias cannot be removed until the "ringing" ceases, which may be as much as 0.2 or 0.3 microsecond after passage of the transmitter pulse. Such a delay is not compatible with low altitude operation.

It is a general object of the present invention to reduce the lower altitude limit at which a pulse Doppler radar navigation system is operable.

Another object is to provide apparatus for turning on the receiver promptly after passage of the transmitter pulse.

Another object is to eliminate the "ringing" of the intermediate frequency amplifier so that the receiver may be turned on sooner.

Briefly stated, the invention comprises a radio frequency switch and an isolator inserted in the transmission path between the duplexer and the modulator. The switch is turned on and off by a pulse synchronized with the pulse applied to the transmitter, thereby substantially preventing leakage of transmitter power to the modulator, preventing "ringing" of the intermediate frequency amplifier, and therefore making it possible to remove the cut off bias on the intermediate frequency amplifier sooner.

Figure 2:
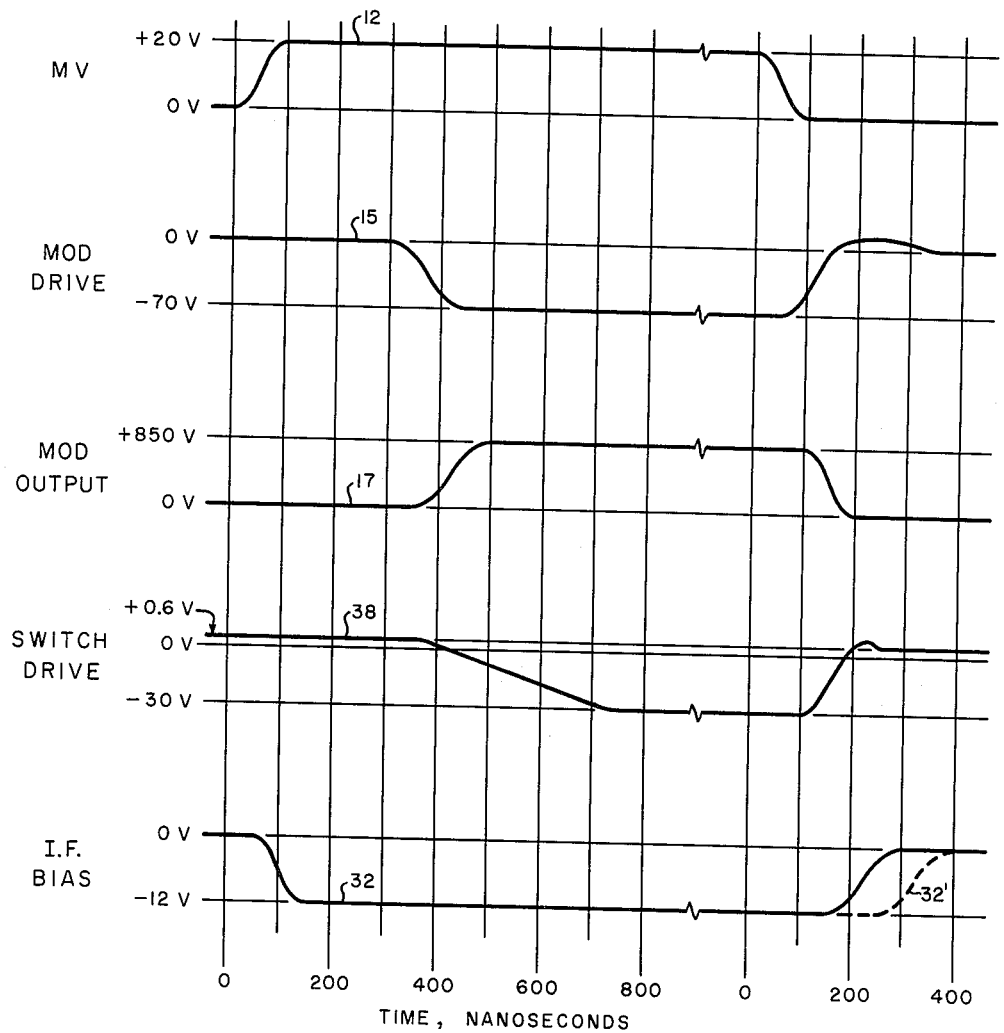

For a clearer understanding of the invention, reference may be made to the following detailed description and the accompanying drawing, in which:

FIGURE 1 is a schematic block diagram of a radar system incorporating the invention; and FIGURE 2 depicts the time relationship of various voltage waveforms.

Referring first to FIGURE 1 there is shown a source 11 such as a multivibrator for generating a series of substantially rectangular pulses 12. These pulses are passed through a circuit 13 which delays the leading edge of each pulse and then to a driving circuit 14. The latter circuit generates a series of negative-going pulses 15 which have a small positive overshoot on the trailing edge as shown. The pulses 15 are applied to a modulator 16 which generates a series of substantially rectangular positive pulses 17 which are applied to a radio frequency generator 18 such as a magnetron. The magnetron generates pulses of radio frequency energy which pass through a duplexer 19 and are radiated by an antenna 21. After reflection from an object such as the earth, the energy is picked up by the antenna 21, passes through the duplexer 19, and then through a radio frequency switch 22 and isolator 23 to a balanced modulator 24. The energy from a local oscillator 25 is also applied to the modulator 24 generating difference frequencies which are passed to an intermediate frequency amplifier 26.

The pulses 12 from the multivibrator 11 are also passed through a circuit 27 which delays the trailing edge of each pulse. The pulses so delayed are applied to an inverting amplifier 28 which generates a series of negative pulses 29. These pulses contain components within the pass band of the intermediate frequency amplifier 26 and to remove these components the pulses 29 are passed through a low pass filter 31. The resulting pulses 32 are applied to the intermediate frequency amplifier 26, so as to bias one or more stages thereof to cut off. The output of the intermediate frequency amplifier is passed to a detecting circuit 33, then to an amplifier 34 and finally to a utilization device 36. The latter device may comprise visual displays of ground speed and drift angle, electrical signals indicative thereof, and course computing circuits or auto pilots.

The delay circuits 13 and 27 are for the purpose of adjusting the relative phase of the various pulses and may comprise circuits in which the usual delay element, such as an inductance, is shunted by a diode poled so that, in the case of the circuit 13, the positive going portion (the leading edge) must pass through the delay element while the negative going portion (the trailing edge) passes through the diode. In the circuit 27 the polarity of the diode is reversed.

Except for the switch 22 and the isolator 23, and assuming a direct connection between the duplexer 19 and the modulator 24, the circuit is conventional. In the specific example being described the driver circuit 14 generates pulses 15 having a positive overshoot. This form of pulses has been found to be particularly advantageous as more fully explained in the copending applications of John D. Fackler and Philip J. Goetz, Serial No. 304,935, filed August 27, 1963, for Pulse Generator. Briefly stated, the cited application describes a pulse generator in which a modulator tube is normally moderately conductive in the interval between pulses during which time an inductance is charged. The negative-going pulse 15 cuts off the modulator tube causing the inductance to discharge through the R.F. generator tube. At the end of the pulse, modulator tube is rendered heavily conductive by the positive overshoot to provide a low impedance path which quickly discharges the stray capacitance associated with the R.F. generator tube. However, regardless of the type of modulator, radio frequency pulses are transmitted and received after reflection, and the intermediate frequency amplifier 26 is gated off substantially during the period of transmission. The pulse widths and the various delays are adjusted so as to turn on the intermediate frequency amplifier 26 as soon as possible after the cessation of transmission consistent with preventing noise from being passed through the intermediate frequency amplifier.

As previously mentioned a certain amount of energy from the R.F. tube 18 leaks through the duplexer 19 to the modulator 24 where it is mixed wtih energy from the local oscillator 25 and applied to the intermediate frequency amplifier 26 causing it to ring. It is therefore necessary, in the absence of the diode switch 22 and the isolator 23, to delay the trailing edge of the pulse 32 so as to maintain the amplifier 26 in its cut off condition until ringing has ceased. To overcome this difficulty the present invention includes the switch 22 and the isolator 23. The switch 22 is a commercially available item comprising a diode mounted in a cavity resonator such as a section of rectangular wave guide. When the diode is forward biased, energy passes through with very little attenuation. However, when the diode is reversed biased the switch acts as a short circuit. The output of the driver circuit 14 is connected to an isolating amplifier 37, such as an emitter follower, which generates pulses 38 which are applied to the diode switch 22 so as to reverse bias the diode substantially during periods of transmission. This has the effect of blocking the path from the duplexer 19 to the modulator 24.

This arrangement prevents leakage of transmitter power to the modulator 24, but, in the absence of isolator 23, introduces an additional problem. The modulator 24 is a conventional balanced modulator, but, of course, it is not perfect. It has been found that some energy from the local oscillator 25 passes through the modulator 24 to the diode switch 22. When the diode is passing from one bias condition to the other, the switch acts as a nonlinear reflector or modulator causing the energy to be reflected back into the modulator 24 at a different frequency. There it is mixed with energy from the oscillator 25 and the resulting modulation products are passed to the amplifier 26 again causing it to ring. To overcome this additional difficulty the isolator 23 is included. The isolator 23 is a conventional three-armed circulator such as a ferrite device in which energy entering any arm circulates in one direction only as indicated by the arrow and leaves by the next arm. The first arm is connected to the diode switch 22, the second arm to the modulator 24 and the third arm to an absorptive load schematically shown as the grounded resistor 39. Thus, any energy from the oscillator 25 leaking through the modulator 24 is dissipated harmlessly in the load 39, the amplifier 26 is prevented from ringing and the trailing edge of the pulse 32 may be adjusted to turn the amplifier 26 back much sooner.

Referring now to FIGURE 2, there are shown the shapes and time relationships of the various pulses as used in a specific embodiment of the invention. The ordinates are of various scales, as indicated, but the abscissae are all to the same time scale. The flat central portions of all of the pulses have been omitted, as indicated by the break in each line, in order to show the leading and trailing edges to a larger scale. In one embodiment, the pulses were from about 2 to about 4 microseconds wide, depending upon the adjustment of the multivibrator 11 (FIG. 1).

The start of the rise of the pulse 12 is regarded as the reference time for the leading edges of the pulses. The delay circuit 13 (FIG. 1) causes the leading edge of the pulse 15 to lag by about 300 nanoseconds. The pulse 17 lags the pulse 15 by about 50 nanoseconds due to the inherent delay in the modulator circuit 16. The amplifier 37 has about the same inherent delay as the modulator circuit 16 so that the switch drive pulse 38 starts to fall at approximately the same time that the pulse 17 starts to rise. The delay circuit 27 does not delay the leading edge of the pulse 12 but the inherent delay introduced by the amplifier 28 and the filter 31 causes the pulse 32 to start to fall about 50 nanoseconds after the pulse 12 starts to rise. It is apparent from FIGURE 2 that the pulse 32 has completed its fall and has cut off the I.F. amplifier 26 well before the modulator output pulse 17 has started to rise.

The trailing edges of the pulses are more significant for present purposes since they determine how soon, after cessation of transmission, the receiver can be made operative. The start of the fall of the pulse 12 is regarded as the reference time for the trailing edges. The circuit 13 does not delay the trailing edge of the pulse 12, but the inherent delay in the driver circuit 14 causes the pulse 15 to start to rise about 50 nanoseconds after the pulse 12 starts to fall. The modulator circuit 16 also has an inherent delay of about 50 nanoseconds and the modulator output pulse 17 starts to fall about 100 nanoseconds after the pulse 12 starts to fall. The amplifier 37 also has an inherent delay of about 50 nanoseconds so the switch drive pulse 38 starts to rise at the same time, that is, at about 100 nanoseconds after the pulse 12 starts to fall. The delay circuit 27 is adjusted to make the I.F. gate pulse 32 start to rise about 150 nanoseconds after the pulse 12 starts to fall.

The modulator output pulse 17 represents the voltage on the oscillator tube 18 and as it falls from the maximum value, spurious oscillations are generated at various frequencies, which oscillations must be prevented from influencing the utilization devices 36. Accordingly, the receiver must be maintained in an off condition until the pulse 17 has fallen to zero. The switch drive pulse 38 rises as the pulse 17 falls and the switch 22 is fully conductive at about the time the pulse 17 has fallen to zero. Ringing of the I.F. amplifier 26 has been substantially prevented by the switch 22 and isolator 23 so that it is possible to remove the cut off bias very soon after the modulator output pulse 17 has fallen to zero. The switch 22 also serves to block the passage of radio frequency energy to the receiver and it is possible to start removing the bias of the pulse 32 while the pulse 17 is still falling. The delay circuit 27 adjusts the starting time of the rise of the pulse 32 and it has been found that optimum performance is obtained when the pulse 32 starts to rise about 50 nanoseconds after the pulse 17 starts to fall. Such adjustment removes the cut off bias entirely about 100 nanoseconds after the pulse has reached zero.

In the absence of the switch 22 and isolator 23, the I.F. amplifier 26 would ring, as previously discussed, and it would be necessary to delay the removal of the cut off bias for an additional 100 nanoseconds or more, as indicated by the dotted curve 32'. While 100 nanoseconds may seem to be a very short time, its significance becomes apparent when it is recalled that electromagnetic wave energy travels about 100 feet in 100 nanoseconds. Accordingly, turning on the receiver 100 nanoseconds sooner reduces by 50 feet the range from which pulse echoes can be received.

The effectiveness of the invention has been demonstrated by actual tests. A complete Doppler radar navigation system excluding the switch 22, the isolator 23 and the amplifier 37 was installed in an aircraft. Careful adjustment achieved satisfactory operation at altitudes as low as 60 feet above the terrain. The system was then modified by the inclusion of the switch 22, the isolator 23 and the amplifier 37. Satisfactory performance was then obtained at altitudes as low as 20 feet above the terrain.

Although a specific embodiment of the invention has been described for illustrative purposes, many modifications will occur to those skilled in the art. It is therefore desired that the protection afforded by Letters Patent be limited only by the true scope of the appended claims.

What is claimed is:

1. In a pulsed radar system including a transmitter and a receiver coupled to an antenna through a duplexer, the improvement which comprises,
   a radio frequency switch and an isolator serially connected and interposed between said duplexer and said receiver, and
   means for rendering said switch nonconductive while said transmitter is operative.

2. In a pulsed radar system including a transmitter and a receiver coupled to an antenna through a duplexer, and means for controlling said transmitter to be operative and inoperative alternately, the improvement which comprises,
   a radio frequency switch and an isolator serially connected and interposed between said duplexer and said receiver, and
   means synchronized with said first named means for causing said switch to pass and block radio frequency energy alternately.

3. A receiver gating circuit, comprising,
   a generator of radio frequency energy,
   an antenna,
   a receiver of radio frequency energy,
   a duplexer interconnecting said generator, said antenna and said receiver,
   timing means for causing said generator to be alternately operative and inoperative, whereby pulses of energy are generated,
   radio frequency switch means and an isolator serially connected and interposed in that order between said duplexer and said receiver, and
   means controlled by said timing means for rendering said switch means alternately open and closed to radio frequency energy.

4. A receiver gating circuit, comprising,
   a generator of radio frequency energy,
   an antenna,
   a receiver of radio frequency energy,
   a duplexer interconnecting said generator, said antenna and said receiver,
   means for biasing said generator to be normally inoperative,
   timing means,
   means controlled by said timing means for rendering said generator operative periodically for a predetermined time interval,
   a radio frequency switch and an isolator serially connected and interposed in that order between said duplexer and said receiver,
   means for biasing said switch to normally pass radio frequency energy, and
   means controlled by said timing means for causing said switch to block radio frequency energy periodically.

5. A receiver gating circuit, comprising,
   a duplexer,
   a generator of radio frequency energy connected to said duplexer,
   an antenna connected to said duplexer,
   a radio frequency diode switch connected to said duplexer,
   a circulator including first, second and third arms for transmitting radio frequency energy entering any arm to the next succeeding arm,
   said first arm being connected to said switch,
   a receiver of radio frequency energy connected to said second arm,
   an absorptive load connected to said third arm,
   means for biasing said generator to be normally inoperative,
   timing means,
   means controlled by said timing means for rendering said generator operative periodically for a predetermined time interval,
   means for biasing said switch to normally pass radio frequency energy, and
   means controlled by said timing means for causing said switch to block radio frequency energy periodically.

6. A receiver gating circuit, comprising,
   a generator of radio frequency energy,
   an antenna,
   a receiver of radio frequency energy including an intermediate frequency amplifier,
   a duplexer interconnecting said generator, said antenna, and said receiver,
   a source of a first series of pulses constituting timing pulses,
   means controlled by said first series of pulses for generating a second series of pulses,
   means controlled by said second series of pulses for generating a third series of pulses each for rendering said generator operative during each pulse and inoperative during the interval between pulses,
   means also controlled by said first series of pulses for generating a fourth series of pulses each for rendering said intermediate frequency amplifier inoperative,
   a radio frequency switch and an isolator serially connected and interposed in that order between said duplexer and said receiver, and
   means also controlled by said second series of pulses for generating a fifth series of pulses each for causing said switch to block radio frequency energy.

References Cited by the Examiner

UNITED STATES PATENTS 3,021,521   2/62   Hutchins _____ 343—8 X

LEWIS H. MYERS, *Primary Examiner.*

CHESTER L. JUSTUS, *Examiner.*